US008233664B2

(12) United States Patent
Ardis et al.

(10) Patent No.: US 8,233,664 B2
(45) Date of Patent: Jul. 31, 2012

(54) DETERMINING RELATIVE DEPTH OF POINTS IN MULTIPLE VIDEOS

(75) Inventors: Paul Ardis, Pittsford, NY (US); Amit Singhal, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 931 days.

(21) Appl. No.: 12/269,076

(22) Filed: Nov. 12, 2008

(65) Prior Publication Data
US 2010/0119114 A1    May 13, 2010

(51) Int. Cl.
*G06K 9/00* (2006.01)
(52) U.S. Cl. .................................... 382/106; 382/107
(58) Field of Classification Search ................ 382/106, 382/107
See application file for complete search history.

(56) References Cited

U.S. PATENT DOCUMENTS

| | | | |
|---|---|---|---|
| 6,031,564 A | 2/2000 | Ma et al. | |
| 6,263,089 B1 * | 7/2001 | Otsuka et al. ............. | 382/107 |
| 6,320,978 B1 | 11/2001 | Szeliski et al. | |
| 6,348,918 B1 | 2/2002 | Szeliski et al. | |
| 6,504,569 B1 | 1/2003 | Jasinschi et al. | |
| 6,556,704 B1 | 4/2003 | Chen | |
| 6,668,080 B1 | 12/2003 | Torr et al. | |
| 6,686,926 B1 * | 2/2004 | Kaye .......................... | 345/680 |
| 6,847,728 B2 | 1/2005 | Tao et al. | |
| 6,876,474 B2 * | 4/2005 | Kreuzer et al. ............. | 359/22 |
| 6,891,966 B2 | 5/2005 | Chen | |
| 6,940,538 B2 | 9/2005 | Rafey et al. | |
| 7,015,926 B2 | 3/2006 | Zitnick, III et al. | |
| 7,035,451 B2 | 4/2006 | Harman et al. | |
| 7,085,409 B2 | 8/2006 | Sawhney et al. | |
| 7,091,988 B2 | 8/2006 | Hori et al. | |
| 7,113,635 B2 | 9/2006 | Robert et al. | |
| 7,124,022 B2 | 10/2006 | Carmichael et al. | |
| 7,161,606 B2 | 1/2007 | González-Baños et al. | |
| 7,161,614 B1 | 1/2007 | Yamashita et al. | |
| 7,187,809 B2 | 3/2007 | Zhao et al. | |
| 7,221,366 B2 | 5/2007 | Uyttendaele et al. | |
| 7,227,526 B2 | 6/2007 | Hildreth et al. | |

(Continued)

FOREIGN PATENT DOCUMENTS
WO  01/86935  11/2001
(Continued)

OTHER PUBLICATIONS

A. Levin, et al., "Image and Depth from a Conventional Camera with a Coded Aperture", ACM Transactions on Graphics, vol. 26, No. 3, 2007, pp. 70-1-70-9.

(Continued)

*Primary Examiner* — Tom Y Lu
(74) *Attorney, Agent, or Firm* — Justin D. Petruzzilli; Raymond L. Owens

(57) ABSTRACT

A relative depth of points captured by at least two recording sources are determined. A first sequence of image frames acquired from a first source and a second sequence of image frames acquired from a second source are received by a data processing system. The data processing system identifies a plurality of points-of-interest, each point-of-interest being present in both the first sequence and the second sequence. The points-of-interest are clustered into common depth planes at least by comparing motion across the sequences of different points-of-interest. Results of the clustering are stored in a processor-accessible memory system.

17 Claims, 5 Drawing Sheets

U.S. PATENT DOCUMENTS

| | | |
|---|---|---|
| 7,236,622 B2 | 6/2007 | Chen et al. |
| 2003/0072483 A1 | 4/2003 | Chen |
| 2004/0109585 A1 | 6/2004 | Tao et al. |
| 2004/0135780 A1 | 7/2004 | Nims |
| 2004/0212612 A1 | 10/2004 | Epstein et al. |
| 2005/0057663 A1 | 3/2005 | Thomas et al. |
| 2007/0024614 A1 | 2/2007 | Tam et al. |

FOREIGN PATENT DOCUMENTS

| | | |
|---|---|---|
| WO | 2006/048875 | 5/2006 |

OTHER PUBLICATIONS

Z. Zhang, et al., "Motion of an Uncalibrated Stereo Rig: Self-Calibration and Metric Reconstruction", Research Report 2079, INRIA Sophia-Antipolis, France, Oct. 1993.

R. Furukawa, et al., "Uncalibrated multiple image stereo system with arbitrarily movable camera and projector for wide range scanning", In Proceedings of the Fifth International Conference on 3-D Digital Imaging and Modeling, (2005) pp. 302-309.

* cited by examiner

DETERMINING RELATIVE DEPTH OF POINTS IN MULTIPLE VIDEOS

FIELD OF THE INVENTION

This invention relates to, among other things, determining a relative depth of points in multiple video sequences recorded by different sources.

BACKGROUND

Computer vision methods restricted to laboratory use are like skyscrapers without elevators: intriguing, but impractical. For instance, while it is possible to precisely calculate depth maps in overlapping views given sufficient scene and camera information, most practical situations do not allow for such precision and prior knowledge. Accordingly, a need in the art exists for a robust method for producing depth maps from video that does not have the benefit of extensive scene and camera information.

SUMMARY

The above-described problem is addressed and a technical solution is achieved in the art by systems and methods for determining a relative depth of points captured by at least two recording sources, such as cameras, according to various embodiments of the present invention. In some embodiments, a first sequence of image frames acquired from a first camera and a second sequence of image frames acquired from a second camera are received by a data processing system. The data processing system identifies a plurality of points-of-interest, each point-of-interest being present in both the first sequence of image frames and the second sequence of image frames. The points-of-interest are clustered into common depth planes at least by comparing motion across the sequences of image frames of different points-of-interest. Results of the clustering are stored in a processor-accessible memory system.

Depth planes may be deemed to be closer or further from a camera as compared to other depth planes based at least upon an amount of motion exhibited by points-of-interest in the depth planes. For example, points-of-interest in a first depth plane may exhibit more motion than points-of-interest in a second depth plane. In this case, the first depth plane may be deemed to be closer than the second depth plane because the points-of-interest therein moved more, relative to the cameras. That is, closer points tend to exhibit more lateral motion than more distant points.

Having clustered points-of-interest into common depth planes, a relative distance of different points-of-interest from the recording sources may be determined. For example, points-of-interest at a common depth plane may be deemed to be at or approximately at a same distance from each camera. Points-of-interest in closer depth planes may be deemed to be closer to the recording sources than points-of-interest in more distant depth planes. Accordingly, depth maps may be generated with little or no information about the cameras being used. And, such depth maps may be generated while knowing nothing more than trajectories for points-of-interest across the sequences of image frames.

According to some embodiments, the clustering of points-of-interest into common depth planes is facilitated by identifying sets of trajectories, each set of trajectories associated with a single point-of-interest and including at least two trajectories, each trajectory in each set indicating motion of a point-of-interest across only one of the sequences of image frames. In this regard, a set of mapping functions may be identified for each set of trajectories, each mapping function associated with a single point-of-interest, and each mapping function relating one trajectory within a set of trajectories associated with a single interest point to another trajectory associated with the same interest point but recorded with a different recording source. The mapping functions may also be applied to sets of trajectories associated with different points-of-interest than the point-of-interest associated with the mapping function being applied. Consequently, the comparing of motion in the clustering step may occur at least based on results of the step of applying the mapping function to different sets of trajectories. Such results may be, for example, determined error amounts associated with each application of a mapping function to a set of trajectories associated with a different point-of-interest. In these instances, a threshold error amount may be used to determine whether points-of-interest are at a common depth plane.

In some embodiments, motion between the first camera and the second camera is non-negligible. In these cases, such motion may be negated prior to identifying the sets of trajectories referred to above.

In some embodiments, non-point-of-interest points are also associated with common-depth plane clusters. Such associating may occur at least through the use of optical flow vectors. The non-point-of-interest points and the point-of-interest points may or may not make up all of the pixels in the image frames in the sequences of image frames.

In some embodiments, a quantitative distance of at least one of the depth planes from at least one of the cameras is determined based at least upon an analysis of camera focal length, camera angles of tilt relative to a constant set of world coordinates, or camera 3-dimensional world coordinates relative to a fixed 3-dimensional landmark. Having such quantitative distances for points in both sequences of image frames from different cameras allows three dimensional models to be produced. For example, some embodiments include synthesizing an image-based-rendering result image based at least upon the determined quantitative distances and associated trajectories.

Accordingly, one of ordinary skill in the art will appreciate that depth maps may be recovered from overlapping video under minimal capture assumptions, where computational complexity is proportional to scene complexity. By observing feature trajectories that appear in multiple videos (formed by salient features undergoing unconstrained combinations of scene and camera motion), a temporal alignment may be determined, which is necessary to rectify each pair of videos and to identify features that are located at approximately the same depth plane relative to the camera configuration. An extremely small number of computations are then required to identify the depth layer that best classifies each point-of-interest, with this number growing sublinearly with the number of feature depth layers.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale or describe all feasible embodiments.

DETAILED DESCRIPTION

Embodiments of the present invention pertain to determining a relative depth of points recorded from image sequences (e.g., video) acquired from at least two cameras. Such relative depths may be used, according to some embodiments, to generate a depth map. Also, according to some embodiments, such relative depths may be determined from relatively few capture assumptions, where computational complexity is proportional to scene complexity. For instance, a relative depth of points captured by multiple monoscopic videos may be determined without explicitly solving for stereo or calibrating any of the cameras involved. In some embodiments, feature trajectories (formed by salient features represented at least in part as points-of-interest undergoing unconstrained combinations of scene and camera motion) that appear in multiple videos are observed, allowing a temporal alignment to be determined. Such temporal alignment rectifies each pair of videos and identifies features that are located at approximately the same depth relative to a configuration of the cameras that acquired the videos. A small number of computations are then required to identify the depth layer that best classifies each pixel, with this number growing sublinearly with the number of feature depth layers. Advantageously, embodiments of the present invention may be configured to work on uncalibrated video sequences, do not require static camera(s) for capture, and are computationally inexpensive The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

Further, it should be noted that, unless otherwise explicitly noted or required by context, the word "or" is used in this disclosure in a non-exclusive sense.

Figure 5:
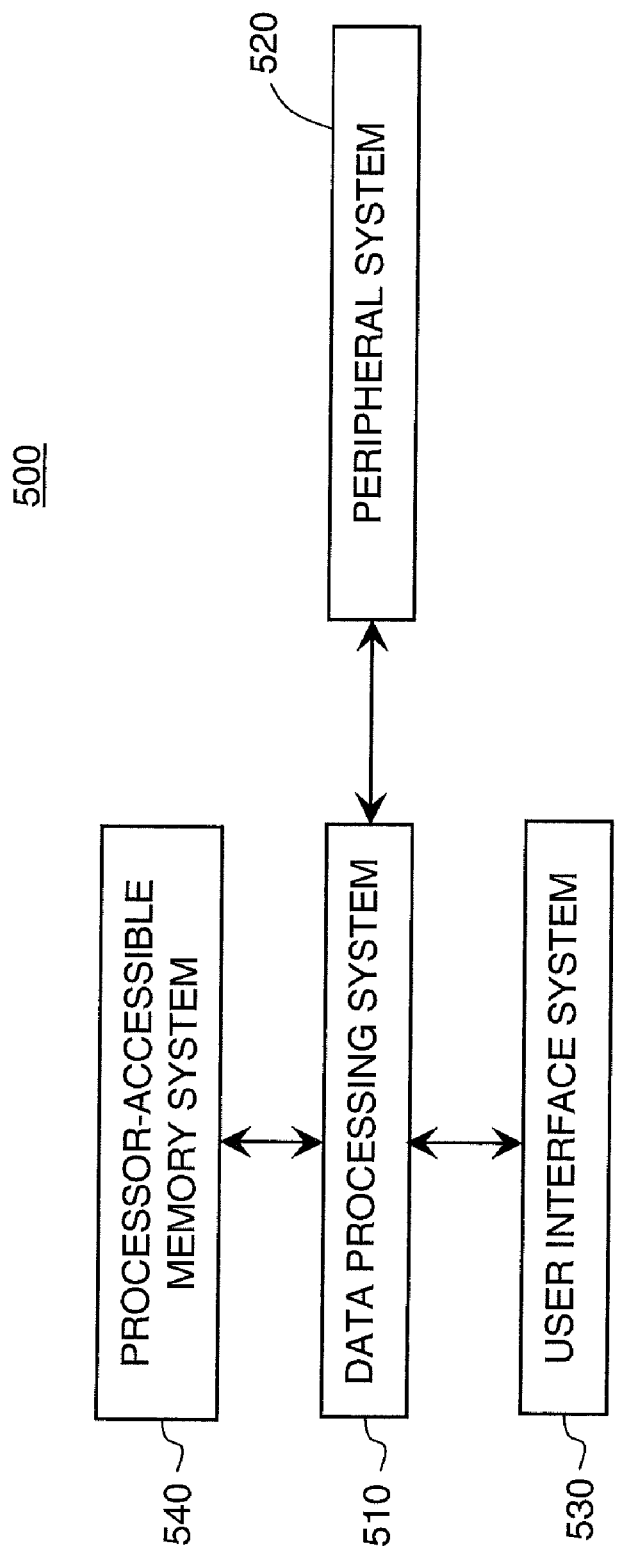
FIG. 5 illustrates a system for determining a relative depth of points from at least two cameras, according to an embodiment of the present invention.

FIG. 5 illustrates a system 500 for determining a relative depth of points from at least two cameras, according to an embodiment of the present invention. The system 500 includes a data processing system 510, a peripheral system 520, a user interface system 530, and a processor-accessible memory system 540. The processor-accessible memory system 540, the peripheral system 520, and the user interface system 530 are communicatively connected to the data processing system 510.

The data processing system 510 includes one or more data processing devices that implement the processes of the various embodiments of the present invention, including the example processes of FIGS. 1-4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 540 includes one or more processor-accessible memories configured to store information, including the information needed to execute the processes of the various embodiments of the present invention, including the example processes of FIGS. 1-4 described herein. The processor-accessible memory system 540 may be a distributed processor-accessible memory system including multiple processor-accessible memories communicatively connected to the data processing system 510 via a plurality of computers and/or devices. On the other hand, the processor-accessible memory system 540 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 540 is shown separately from the data processing system 510, one skilled in the art will appreciate that the processor-accessible memory system 540 may be stored completely or partially within the data processing system 510. Further in this regard, although the peripheral system 520 and the user interface system 530 are shown separately from the data processing system 510, one skilled in the art will appreciate that one or both of such systems may be stored completely or partially within the data processing system 510.

The peripheral system 520 may include one or more devices configured to provide sequences of image frames from at least two cameras to the data processing system 510. For example, the peripheral system 520 may include digital video cameras, cellular phones, regular digital cameras, or other data processors. The data processing system 510, upon receipt of sequences of image frames from a device in the peripheral system 520, may store such sequences of image frames in the processor-accessible memory system 540.

The user interface system 530 may include a mouse, a keyboard, another computer, or any device or combination of devices from which data is input to the data processing system 510. In this regard, although the peripheral system 520 is shown separately from the user interface system 530, the peripheral system 520 may be included as part of the user interface system 530.

The user interface system 530 also may include a display device, a processor-accessible memory, or any device or combination of devices to which data is output by the data processing system 510. In this regard, if the user interface system 530 includes a processor-accessible memory, such memory may be part of the processor-accessible memory system 540 even though the user interface system 530 and the processor-accessible memory system 540 are shown separately in FIG. 5.

Figure 1:
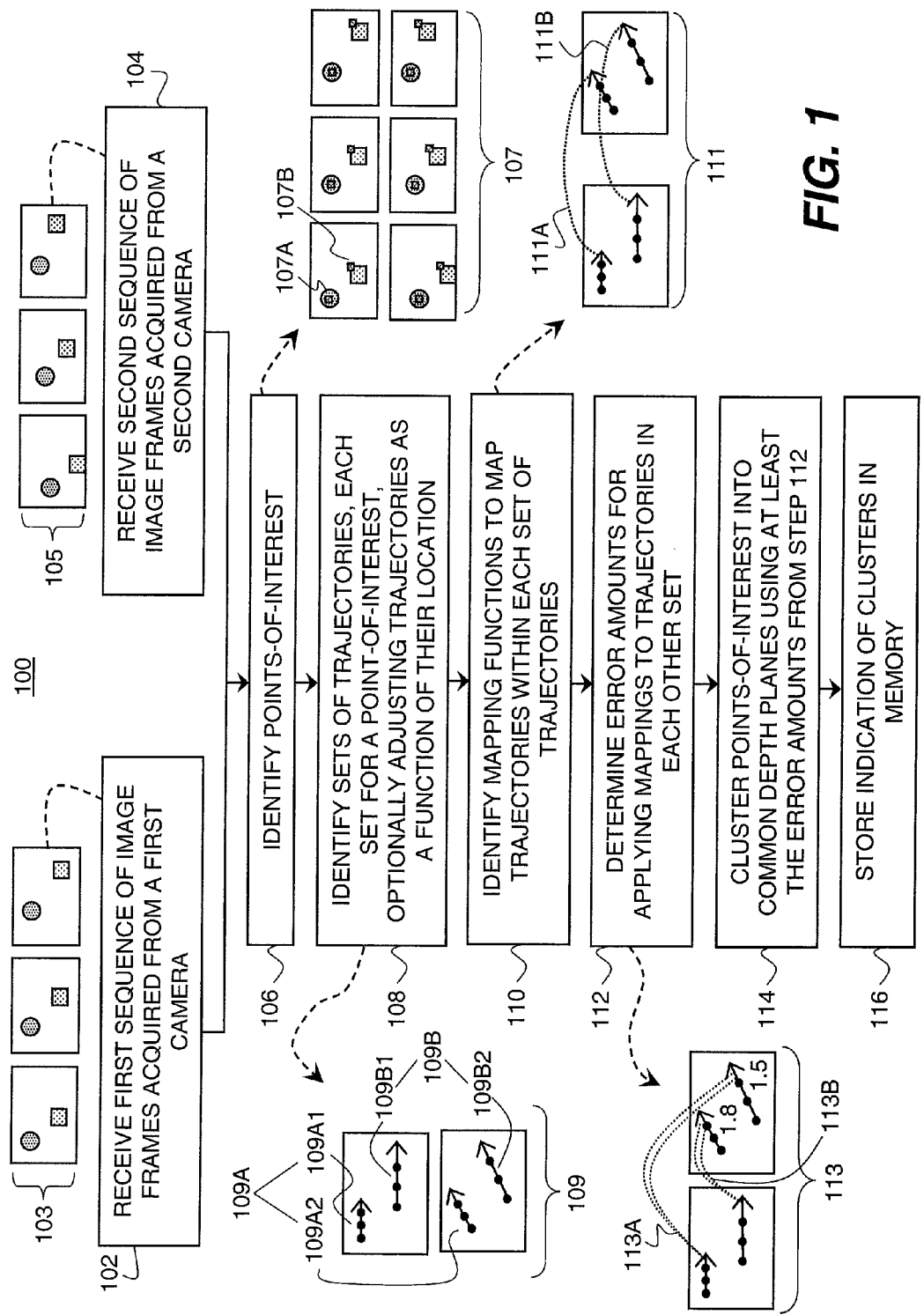
FIG. 1 illustrates a method for determining a relative depth of points captured by at least two cameras, according to an embodiment of the present invention.

FIG. 1 illustrates a method 100 for determining a relative depth of points-of-interest from a plurality of images acquired by at least two sources, such as cameras. The method 100 includes a step 102 of receiving a first sequence of image frames acquired from a first camera. An example illustration of a sequence of image frames 103 is provided where two objects are moving horizontally relative to a static first camera. Similarly, at step 104, a second sequence of image frames is received, this second sequence having been acquired from a second camera. An example illustration of a sequence of image frames 105 is provided, where the same objects represented in sequence 103 are moving diagonally in sequence 105 relative to the static second camera. Although FIG. 1 illustrates only two sequences of image frames being received, one of ordinary skill in the art will appreciate that more sequences of image frames from other different cameras also may be received.

The method 100 also includes the step 106 of identifying salient points-of-interest within each of the sequences of image frames 103, 105. These salient points-of-interest may be local intensity maxima, Harris corners, Maximally Stable Extremal Region centroids, or any other salient point-of-interest as identified in the literature. Further, the points-of-interest may correspond to a computably significant point (such as a centroid) relative to an object present in each of the sequences of image frames 103, 105, a point located within an object in the sequences of images, a point located along the border of an object in the sequences, or any other identifiable point present in all of the image frame sequences 103, 105. The classification of these points-of-interest as being computable points, within, or along the border of points does not affect further processing steps beyond their identification. The points-of-interest may be identified by user selection, automatic detection by an image processing submethod known in the art, or combinations thereof. Examples of such image processing submethods include Harris corner detection, computation of the centroids of detectable Maximally Stable Extremal Regions, or any other method for detection of salient points-of-interest as identified in the literature.

Example 107 illustrates an output of step 106 and continues the example provided with respect to image sequences 103, 105. In particular, the top row of rectangles in example 107 represent the first sequence of image frames 103, and the bottom row of rectangles in example 107 represent the second sequence of image frames 105. In this regard, example 107 represents an identification at step 106 of two points-of-interest (a $1^{st}$ point of interest 107a, and a $2^{nd}$ point of interest 107b), where the first point-of-interest 107a is the centroid of a first object (a circle in this example) and the second point-of-interest 107b is located along the border of a second object (a square in this example). Note that although the first and second points-of-interest 107a, 107b are labeled only in the first frame (rectangle) of the top row of rectangles in example 107, such points-of-interest are present and illustrated by a small black dot in each of the other five frames (rectangles) in example 107.

The method 100 also includes a step 108 of determining a number of feature trajectories, where a feature trajectory indicates the location of a single point-of-interest throughout each of the image frames in one of the sequences of image frames 103, 105. In some embodiments, it may be beneficial for the feature trajectories to provide positional information for points-of-interest (for example 107a, 107b) as if the sequences of images 103, 105 received in steps 102, 104 respectively were received from static cameras. In this regard, if the cameras are moving relative to one another, it may be beneficial in some but not all embodiments to adjust the positional information of points-of-interest in a manner that attempts to eliminate the effects of such relative camera motion.

In some embodiments, step 108 calculates sets of trajectories (109a, 109b for example), each set of trajectories associated with each point-of-interest (107a, 107b for example) identified in step 106. A first trajectory (109a1, for example) of the first set of trajectories (109a, for example) represents at least a sequence of locations of the first point-of-interest (107a, for example) throughout each frame of the first sequence of image frames (103, for example). A second trajectory (109a2, for example) of the first set of trajectories (109a, for example) represents at least a sequence of locations of the first point-of-interest (107a, for example) throughout each frame of the second sequence of image frames (105, for example). These trajectories may additionally include a polynomial representation of interpolated or extrapolated points (for more refined matching in later step 112, for compensation of non-linear frame offset between image sequences, for compensation of non-integer frame rate ratio between image sequences, or for other purposes), directional information between each pair of points (for matching with optical flow vectors in a later step 202, or for other purposes), average direction between all points (for fast estimated trajectory matching in a later step 110, or for other purposes), or other derivable properties of the points represented by each trajectory (for any of a number of purposes).

In addition, step 108 may include calculating a second set of trajectories (109b, for example) for a second point-of-interest (107b, for example) present in each frame of each sequence of image frames (103, 105, for example). A first trajectory (109b1, for example) of the second set of trajectories (109b, for example) represents a sequence of locations of the second point-of-interest (107b, for example) throughout each frame of the first sequence of image frames (103, for example), and a second trajectory (109b2, for example) of the second set of trajectories (109b, for example) represents a sequence of locations of the second point-of-interest (107b, for example) throughout each frame of the second sequence of image frames (105, for example). In this regard, in some embodiments, each set of trajectories (109a, 109b, for example) may correspond to the location of two foreground objects (round object corresponding to point 107a and square object corresponding to point 107b, respectively, for example) moving against a static background in a video captured by two static cameras pointed at some point of maximum focus and separated by some fixed distance.

As alluded to above, example 109 demonstrates the identification of two sets of trajectories 109a, 109b, each trajectory (109a1, 109a2, 109b1, 109b2) representing a series of the recorded locations of a point-of-interest over time, fitting polynomial approximations (in this case, straight lines) and including a determination of the direction of motion for each point-of-interest. Trajectory data is not modified to correct for camera motion as it is not present in this example, although additional examples may include the identification of non-negligible camera motion and its cancellation using techniques known in the art during step 108.

The method 100 also includes a step 110 of calculating mapping functions to map each trajectory within each set of trajectories to other trajectories within that same set of trajectories. For example, in the situation where two sets of trajectories (e.g., 109a, 109b) are calculated at step 108, a first mapping function (e.g., 111a in example 111) may be calculated for the first set of trajectories (109a, for example), and a second mapping function (111b, for example) may be calculated for the second set of trajectories (109b, for example). In this instance, the first mapping function (111a, for example) may map the first trajectory (109a1, for example) of the first set of trajectories (109a, for example) to the second trajectory (109a2, for example) of the first set of trajectories (109a, for example). An example of this first mapping function is a fundamental matrix that minimizes squared projection error when used to project the first trajectory onto the second trajectory in the first set of trajectories.

The second mapping function (111b, for example) may map the first trajectory (109b1, for example) of the second set of trajectories (109b, for example) to the second trajectory (109b2, for example) of the second set of trajectories. An example of this second mapping function is a fundamental matrix that minimizes squared projection error when used to project the first trajectory onto the second trajectory in the second set of trajectories. Although the above describes the case where we have 2 recording sources and 2 sequences of image frames, similar processes apply for the case where there are 3 or more recording sources or sequences of images except that a set of mapping functions is created for each set of trajectories, each mapping function within the set of mapping functions associated with a set of trajectories for a single point-of-interest representing the transformation of a trajectory for a point-of-interest to another trajectory for the same point-of-interest in a different recording source.

As described above, example 111 demonstrates step 110 by indicating the determination of mapping functions 111a, for example, that map locations of the point-of-interest 107a from one trajectory 109a1 in the first sequence of image frames 103 to the locations of the point-of-interest 107a in the corresponding trajectory 109a2 in the second sequence of image frames 105. Similarly, a mapping function 111b, for example, maps the locations of the point-of-interest 107b in trajectories 109b1, 109b2 in the first and second sequences of image frames 103, 105, respectively. These functions 111a, 111b map (with negligible error) the identified points along a trajectory in the first sequence of image frames 103 to its corresponding trajectory in the second sequence of image frames 105, as well as provide a mapping function for unidentified points that are interpolated or extrapolated.

The method 100 also includes a step 112 of determining error amounts for cross-trajectory-set mappings. For example, step 112 may involve determining a number of pairings of trajectories from the first set of trajectories (109a, for example) with those from the second set of trajectories (109b, for example) that pertain to different points-of-interest. For instance, trajectory 109a1 could be paired with trajectory 109b2, because they are from different sets of trajectories (109a, 109b) and because they pertain to different points of interest (107a, 107b). Likewise, trajectory 109b1 could be paired with trajectory 109a2. With these pairings, step 112 may identify a number of sets of alignment parameters, where alignment parameters include one or more numerical values such that the locations of paired trajectories can be warped (illustrated, for example, by 113a representing a warp of trajectory 109a1 to trajectory 109b2 and by 113b representing a warp of trajectory 109a2 to trajectory 109b1) to align together in each trajectory. Such alignment parameters may be thought of as error amounts. An example 113a of this step 112 is provided for clarity, where the mapping function 111a for the trajectories 109a1, 109a2 is applied to the trajectories 109a1, 109b2 and vice versa, with an example error amount of 1.5 indicated for illustration purposes only. Similarly, illustration 113b shows the mapping function 111b for the trajectories 109b1, 109b2 being applied to the trajectories 109b1, 109a2 and vice versa, with an example error amount of 1.8 indicated for illustration purposes only. Although the above describes the case where there are 2 recording sources, similar steps can be used to compute error amounts for cross-trajectory mapping when there are 3 or more recording sources or sequences of images. The cross-trajectory mapping is performed by applying the corresponding mapping function for a single point-of-interest for 2 recording sources or sequences of images to all other points-of-interest for the same pair of recording sources or sequences of images.

The method 100 may also include the step 114 of determining clusters of points-of-interest based at least upon the error amounts determined at step 112. This clustering of points-of-interest may be performed by identifying which trajectory pairings in step 112 had an error amount lower than a certain threshold. Points-of-interest within a cluster may be deemed to be located within a fixed small distance from a single depth plane per frame, where a depth plane is defined as a plane that is:

parallel to the intersection of the focal planes of the sources that provided the first and second sequences of image frames 103, 105 respectively, and parallel to the intersection of the focal points of the sources that provided the first and second sequences of image frames 103, 105 respectively.

This clustering may be performed using a variety of methods including (but not limited to) clustering of an associated digraph whose edge weights are equal to the error amounts of the previous step, clustering of all mapping function pairs whose associated error is below a constant threshold value, or any other calculable function of the set of error amounts of the previous step. One example clustering method that may be used is Markov Clustering, known in the art, which is performed on the weighted digraph associated with the error amounts of step 112.

The method 100 also includes a step 116 where an indication of the clusters from step 114 may be stored in the processor-accessible memory system 540, the clusters indicating, among other things, which points-of-interest are in or substantially in a same depth plane.

Figure 2:
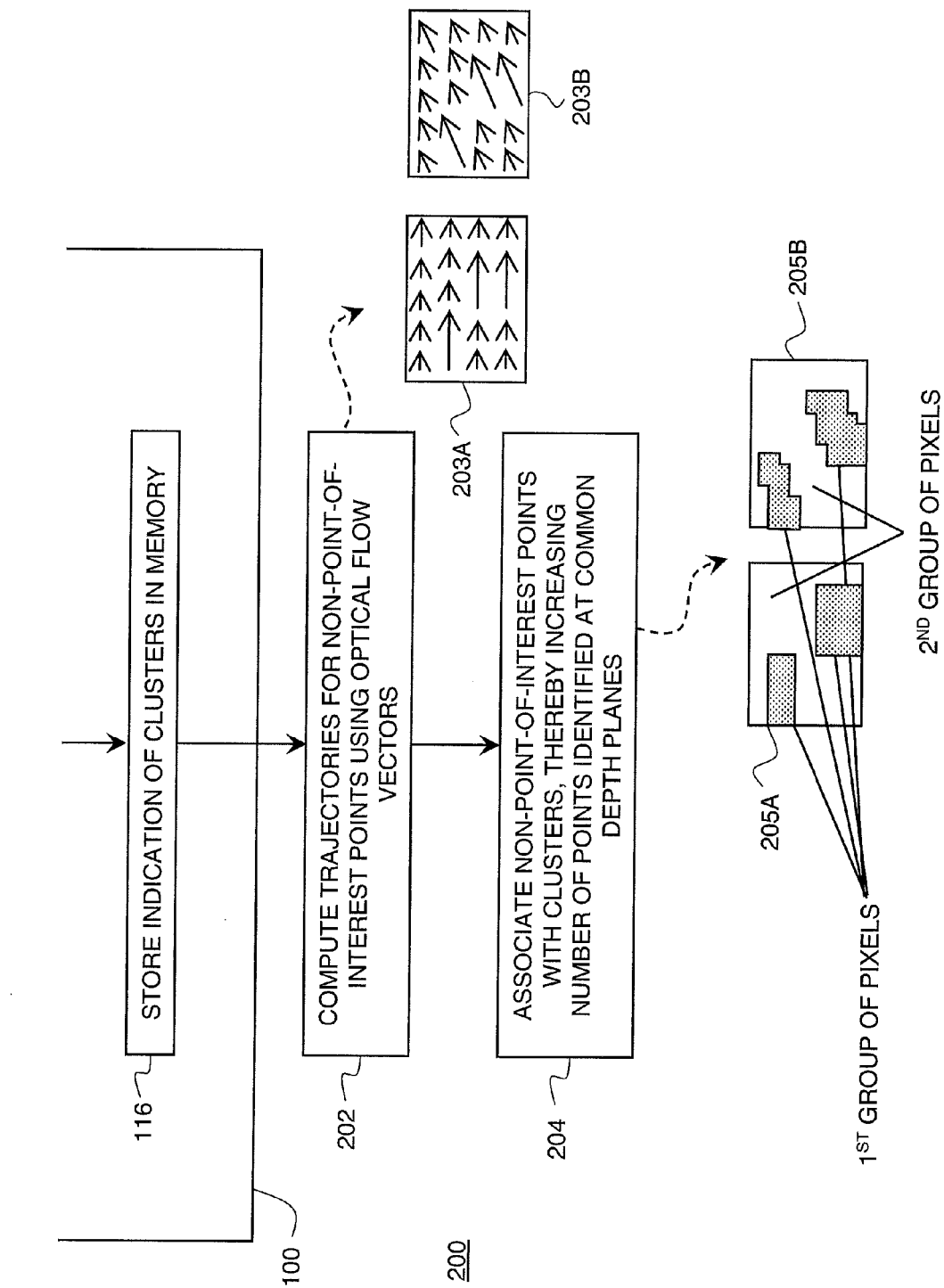
FIG. 2 illustrates additional optional steps to the method of FIG. 1, the additional steps pertaining to associating non-point-of-interest points with common depth plane clusters, according to an embodiment of the present invention.

Having identified which points-of-interest are in or substantially in a same depth plane based at least on the points' associations to particular clusters at steps 114, 116, FIG. 2 illustrates a method 200, according to some embodiments, which associates other points (e.g., non-point-of-interest points) with the particular clusters. In this regard, method 200 indicates which non-point-of-interest points are in or substantially in a same depth plane as each point-of-interest identified as a result of the processing steps in FIG. 1.

To elaborate, the method 200, according to an embodiment, is identical to the method 100 of FIG. 1, but includes the additional steps 202 and 204 after step 116. Step 202 involves computing trajectories for non-point-of-interest ("non-POI") points in the sequences of image frames 103, 105 using optical flow vectors and step 204 involves associating non-point-of-interest ("non-POI") points in the sequences of image frames 103, 105 with one of the clusters of step 116. A non-POI point may be other points in an object (e.g. other points in the circle object encompassing point 107a or the square object encompassing point 107b) or any other point not evaluated in FIG. 1 that is present in all sequences of image frames (103, 105, for example). An advantage of evaluating only certain points with the process of FIG. 1, and then evaluating additional points with the process of FIG. 2 is processing efficiency.

In step 202, a set of trajectories (locations of each non-POI in each frame of each sequence of frames 103,105) for each non-POI is computed using optical flow vectors 203a, 203b known in the art. The association of non-POI points with clusters at step 204 may be performed by utilizing the processing of steps 112, and 114 in FIG. 1 except that the non-POI is associated with the cluster whose mapping function produces the least error when applied to the non-POI trajectory computed in step 202. Stated differently, a non-POI point is associated with the cluster whose associated trajectories, when compared with the non-POI point's optical flow vector, produced the lowest amount of error (as compared to the other clusters). In some embodiments, the method 200 is performed for every point in the sequences of image frames 103, 105. In embodiments such as these, a cluster map (e.g. 205A, 205B) may be generated for one or more frames in a sequence of image frames. The cluster map may be configured to represent all pixels associated with a same cluster as a same color. For example, cluster maps 205A, 205B show a first group of pixels associated with a first cluster as shaded, and a second group of pixels associated with a second cluster as white. In this example, cluster map 205A is associated with an image frame in the sequence of image frames 103. On the other hand, cluster map 205B is associated with an image frame in the sequence of image frames 105. Although not shown in FIG. 2, the associations of non-POI points and clusters, cluster maps, or both, may be stored in the processor-accessible memory system 540.

Figure 3:
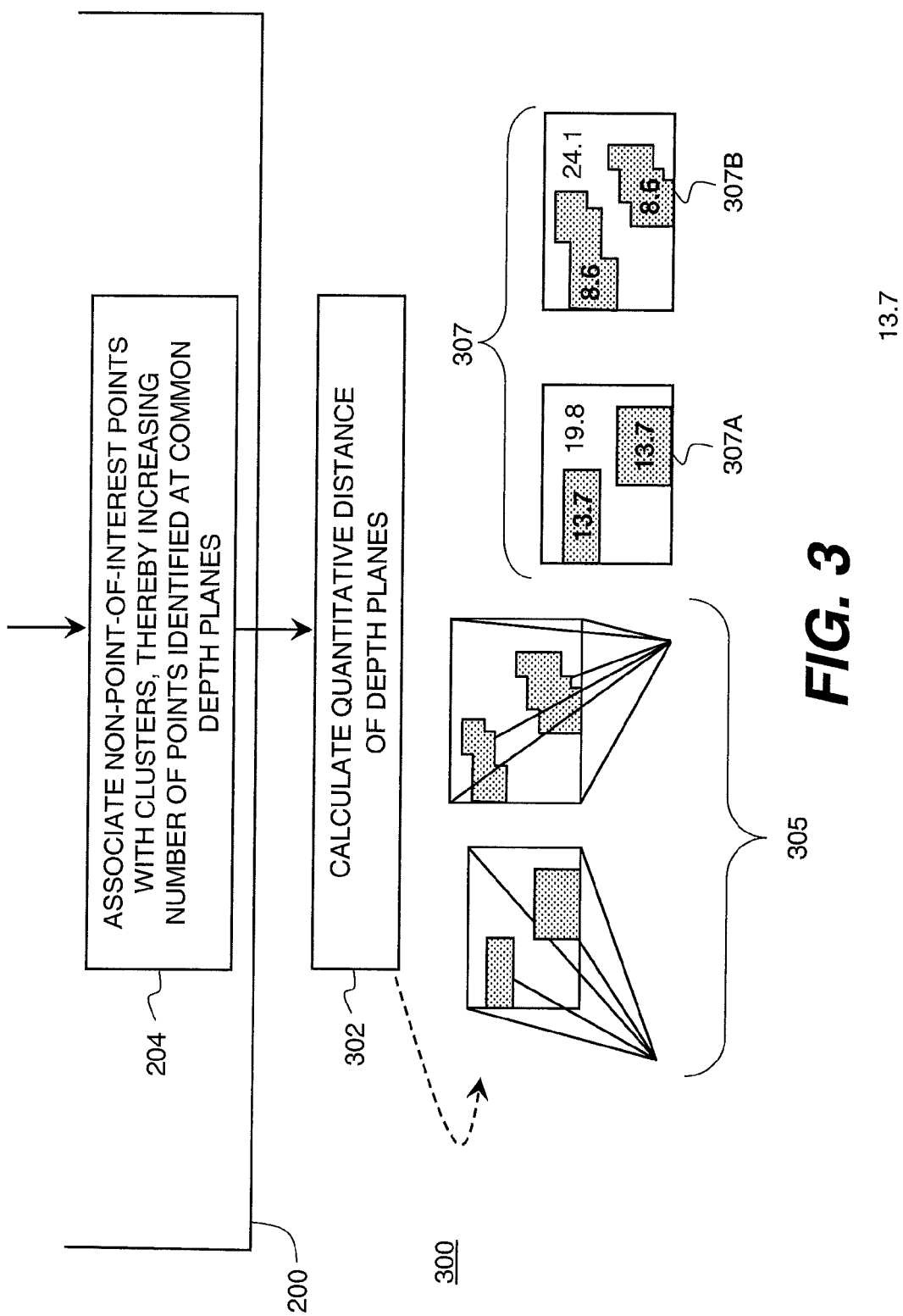
FIG. 3 illustrates an additional optional step to the method of FIG. 2, the additional step pertaining to calculating a quantitative distance of a depth plane, according to an embodiment of the present invention.

Having identified a number of points-of-interest and non-POI points that are located at same or substantially same depth planes, FIG. 3 illustrates a method 300, according to some embodiments of the present invention, that determines actual distances or quantitative distances (e.g., 307) of such depth planes from the cameras. In this regard, the method 300 continues from the method 200 by including an additional step 302 after step 204. Step 302 includes determining, using techniques known in the art, the actual quantitative distance from each camera of the depth planes identified by the groupings of points from step 204. Such techniques may include solving stereoscopic geometric equations (e.g., 305) relating the disparity of points within an image with their expected projection onto the focal plane given zero depth. Such techniques may utilize camera calibration parameters, such as the focal length, camera angles of tilt relative to a constant set of world coordinates (often described as the "focal ray", although other descriptions are also allowed), and 3-dimensional world coordinates of the camera relative to a fixed 3-dimensional landmark. Focal length is frequently included in camera metadata, camera tilt may be determined by an attached tilt sensor, and 3-dimensional world coordinates may be determined by GPS, although other methods for producing each measurement also exist. Camera tilt information may be substituted by object tilt information determined by deduction performed on each object (based on additional stored knowledge such as a pose database). GPS information may be substituted by object size information determined by deduction performed on each object (based on additional stored knowledge such as a size database), and additional functional substitutions of data exist.

Example 307 illustrates depth maps 307a, 307b that show actual distances (for illustration purposes only) of two depth planes from a first camera that captured image frame sequence 103 and a second camera that captured image frame sequence 105, respectively. The distance from the first camera of the shaded depth plane in depth map 307a is 13.7, and the distance from the first camera of the white depth plane in depth map 307a is 19.8. The distance from the second camera of the shaded depth plane in depth map 307b is 8.6, and the distance from the second camera of the white depth plane in depth map 307b is 24.1.

Figure 4:
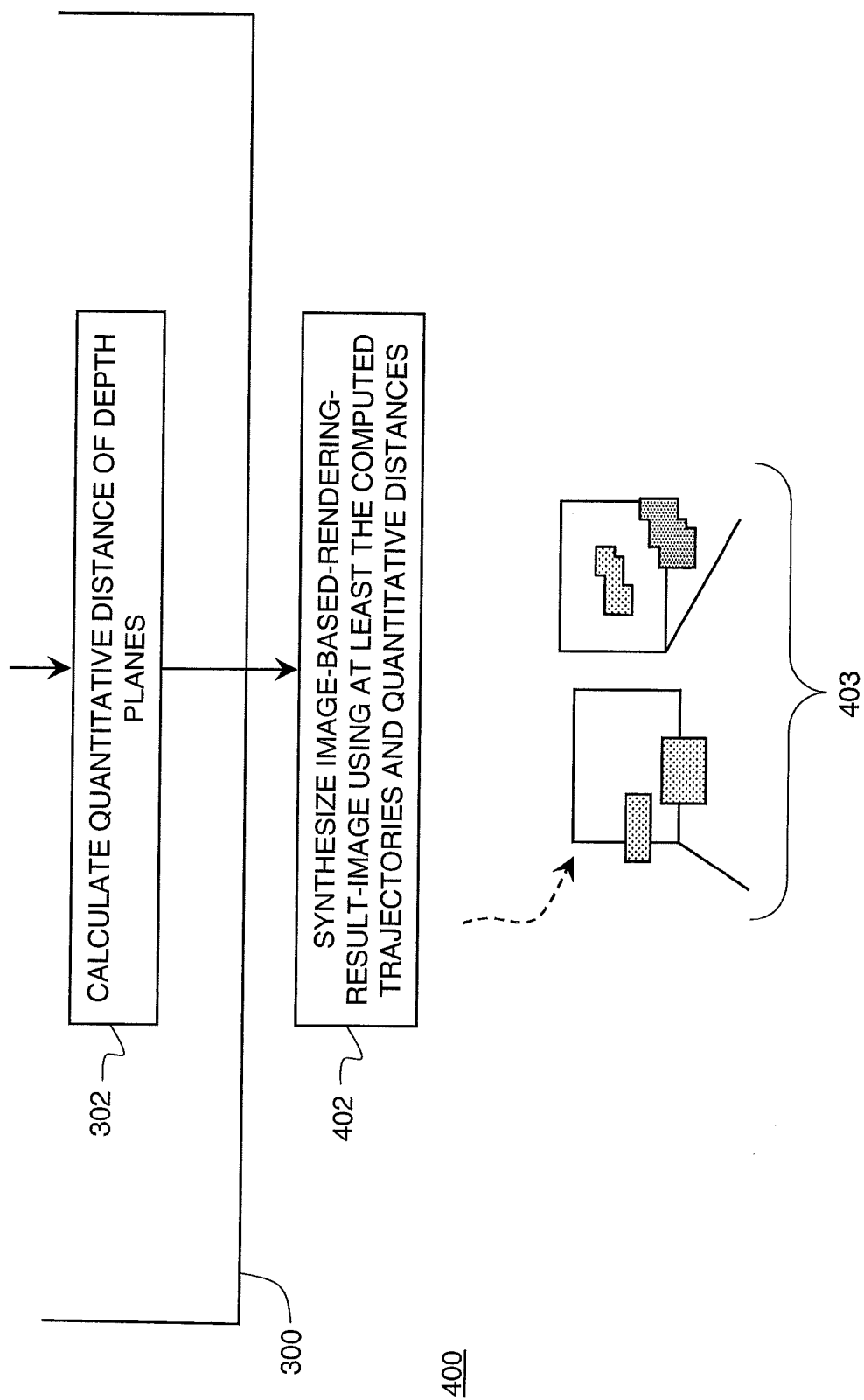
FIG. 4 illustrates an additional optional step to the method of FIG. 3, the additional step pertaining to synthesizing an image-based-rendering result image, according to an embodiment of the present invention.

FIG. 4 illustrates a method 400, according to some embodiments of the present invention, which continues from the method 300 with an additional step 402 after step 302. Step 402 involves synthesizing one or more image-based rendering ("IBR", as is known in the art) result images (e.g., 403) using at least (a) horizontal and vertical positions of at least the identified points-of-interest from step 106 (FIG. 1), and (b) the quantitative distances calculated at step 302. Trajectory information computed in FIG. 1, step 108 may also be used to generate the IBR result images, as described, for example, by Heung-Yeung Shum and Sing Bing Kang. "A Review of Image-based Rendering Techniques", IEEE/SPIE Visual Communications and Image Processing (VCIP) 2000, pp. 2-13, Perth, June 2000.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

Parts List 100 method
102 step
103 sequence of image frames
104 step
105 sequence of image frames
106 step
107a point of interest
107b point of interest
108 step
109a set of trajectories
109a1 first trajectory
109a2 second trajectory
109b set of trajectories
109b1 trajectory
109b2 second trajectory
110 step
111a first mapping function
111b second mapping function
112 step
113b illustration
114 step
116 step
200 method
202 step
203a computed using optical flow vectors
203b computed using optical flow vectors
204 additional steps
205A cluster map
205B cluster map 300 method
302 additional step
307a depth map
307b depth map
400 method
402 additional step
500 system
510 data processing system
520 peripheral system
530 user interface system
540 processor-accessible memory system

What is claimed is:

1. A method for determining a relative depth of points captured by at least two cameras, the method implemented at least in part by a data processing system and comprising the steps of:
   receiving a first sequence of image frames acquired from a first camera;
   receiving a second sequence of image frames acquired from a second camera;
   identifying a plurality of points-of-interest, each point-of-interest being present in both the first sequence of image frames and the second sequence of image frames;
   clustering the points-of-interest into common depth planes at least by comparing motion across the sequences of image frames of different points-of-interest;
   storing results of the clustering in a processor-accessible memory system;
   identifying sets of trajectories, each set of trajectories associated with a single point-of-interest and comprising two trajectories, each of the two trajectories in each set indicating motion of a point-of-interest across only one of the sequences of image frames;
   identifying a mapping function for each set of trajectories, each mapping function associated with a single point-of-interest; and
   applying the mapping functions to sets of trajectories associated with different points-of-interest than the point-of-interest associated with the mapping function being applied, wherein the comparing of motion in the clustering step occurs at least based on results of the applying step.

2. The method of claim 1, wherein the step of applying comprises determining an error amount associated with each application of a mapping function to a set of trajectories associated with a different point-of-interest, and wherein the results of the applying step used in the clustering step include the error amounts.

3. The method of claim 1, further comprising the step of associating non-point-of-interest points with clusters determined in the clustering step.

4. The method of claim 3, wherein the associating of non-point-of-interest points occurs at least through the use of optical flow vectors.

5. The method of claim 1, further comprising the step of determining a quantitative distance of at least one of the depth planes from at least one of the cameras based at least upon an analysis of camera focal length, camera angles of tilt relative to a constant set of world coordinates, or camera 3-dimensional world coordinates relative to a fixed 3-dimensional landmark.

6. The method of claim 5, further comprising the steps of:
   synthesizing an image-based-rendering result image based at least upon the determined quantitative distance and associated trajectories.

7. The method of claim 1, wherein motion between the first camera and the second camera is non-negligible, and wherein the method further comprises the step of negating the motion prior to the step of identifying sets of trajectories.

8. A processor-accessible memory system storing instructions configured to cause a data processing system to implement a method for determining a relative depth of points captured by at least two cameras, wherein the instructions comprise:
   instructions for receiving a first sequence of image frames acquired from a first camera;
   instructions for receiving a second sequence of image frames acquired from a second camera;
   instructions for identifying a plurality of points-of-interest, each point-of-interest being present in both the first sequence of image frames and the second sequence of image frames;
   instructions for clustering the points-of-interest into common depth planes at least by comparing motion across the sequences of image frames of different points-of-interest;
   instructions for storing results of the clustering in a processor-accessible memory system;
   instructions for identifying sets of trajectories, each set of trajectories associated with a single point-of-interest and comprising two trajectories, each of the two trajectories in each set indicating motion of a point-of-interest across only one of the sequences of image frames;
   instructions for identifying a mapping function for each set of trajectories, each mapping function associated with a single point-of-interest; and
   instructions for applying the mapping functions to sets of trajectories associated with different points-of-interest than the point-of-interest associated with the mapping function being applied, wherein the comparing of motion in the clustering step occurs at least based on results of the applying step.

9. The system of claim 8, wherein the applying comprises determining an error amount associated with each application of a mapping function to a set of trajectories associated with a different point-of-interest, and wherein the results of the applying used in the clustering step include the error amounts.

10. The system of claim 8, wherein the instructions further comprise instructions for associating non-point-of-interest points with clusters determined in the clustering.

11. The system of claim 10, wherein the associating of non-point-of-interest points occurs at least through the use of optical flow vectors.

12. The system of claim 8, wherein motion between the first camera and the second camera is non-negligible, and wherein the instructions further comprise instructions for negating the motion prior to identifying sets of trajectories.

13. A system comprising:
   a data processing system; and
   a processor-accessible memory system communicatively connected to the data processing system and storing instructions configured to cause the data processing system to implement a method for determining a relative depth of points captured by at least two cameras, wherein the instructions comprise:
   instructions for receiving a first sequence of image frames acquired from a first camera;
   instructions for receiving a second sequence of image frames acquired from a second camera;
   instructions for identifying a plurality of points-of-interest, each point-of-interest being present in both the first sequence of image frames and the second sequence of image frames;

instructions for clustering the points-of-interest into common depth planes at least by comparing motion across the sequences of image frames of different points-of-interest;

instructions for storing results of the clustering in the processor-accessible memory system;

instructions for identifying sets of trajectories, each set of trajectories associated with a single point-of-interest and comprising two trajectories, each of the two trajectories in each set indicating motion of a point-of-interest across only one of the sequences of image frames;

instructions for identifying a mapping function for each set of trajectories, each mapping function associated with a single point-of-interest; and instructions for applying the mapping functions to sets of trajectories associated with different points-of-interest than the point-of-interest associated with the mapping function being applied, wherein the comparing of motion in the clustering step occurs at least based on results of the applying step.

14. The system of claim 13, wherein the applying comprises determining an error amount associated with each application of a mapping function to a set of trajectories associated with a different point-of-interest, and wherein the results of the applying used in the clustering step include the error amounts.

15. The system of claim 13, wherein the instructions further comprise instructions for associating non-point-of-interest points with clusters determined in the clustering.

16. The system of claim 15, wherein the associating of non-point-of-interest points occurs at least through the use of optical flow vectors.

17. The system of claim 13, wherein motion between the first camera and the second camera is non-negligible, and wherein the instructions further comprise instructions for negating the motion prior to identifying sets of trajectories.

* * * * *